US008114928B2

(12) United States Patent
Gaggar et al.

(10) Patent No.: US 8,114,928 B2
(45) Date of Patent: *Feb. 14, 2012

(54) TRANSPARENT POLYCARBONATE POLYESTER COMPOSITION AND PROCESS

(75) Inventors: Satish Kumar Gaggar, Parkersburg, WV (US); Johannes Jacobus de Moor, Bergen op Zoom (NL); Paul Honigfort, Gaithersburg, MD (US); Gabrie Hoogland, Breda (NL); Mark van Heeringen, Bergen op Zoom (NL); Eelco M. S. van Hamersveld, Raamsdonksveer (NL)

(73) Assignee: SABIC Innovative Plastics IP BV, Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/819,381

(22) Filed: Jun. 21, 2010

(65) Prior Publication Data
US 2011/0086951 A1    Apr. 14, 2011

Related U.S. Application Data

(63) Continuation of application No. 11/245,462, filed on Oct. 5, 2005, now Pat. No. 7,767,738, which is a continuation of application No. 10/373,547, filed on Feb. 24, 2003, now Pat. No. 6,989,190, which is a continuation-in-part of application No. 09/891,731, filed on Jun. 26, 2001, now abandoned, and a continuation-in-part of application No. 09/690,341, filed on Oct. 17, 2000, now abandoned, and a continuation-in-part of application No. 09/690,342, filed on Oct. 17, 2000, now abandoned.

(51) Int. Cl.
C08L 69/00        (2006.01)
C08L 67/02        (2006.01)

(52) U.S. Cl. .......... 524/88; 524/147; 524/414; 524/417; 524/439; 524/440; 524/441; 524/449; 525/67; 525/133

(58) Field of Classification Search .......... None
See application file for complete search history.

(56) References Cited

U.S. PATENT DOCUMENTS

| | | | |
|---|---|---|---|
| 2,465,319 A | 3/1949 | Rex et al. | |
| 2,675,390 A | 4/1954 | Rosenblatt | |
| 2,888,484 A | 5/1959 | Dehm et al. | |
| 2,999,835 A | 9/1961 | Goldberg | |
| 3,047,539 A | 7/1962 | Pengilly | |
| 3,153,008 A | 10/1964 | Fox | |
| 3,334,154 A | 8/1967 | Kim | |
| 3,444,237 A | 5/1969 | Jaffe | |
| 3,635,895 A | 1/1972 | Kramer | |
| 4,001,184 A | 1/1977 | Scott | |
| 4,083,896 A | 4/1978 | Moran et al. | |
| 4,123,436 A | 10/1978 | Holub et al. | |
| 4,125,572 A | 11/1978 | Scott | |
| 4,131,575 A | 12/1978 | Adelmann et al. | |
| 4,188,314 A | 2/1980 | Fox et al. | |
| 4,264,487 A | 4/1981 | Fromuth et al. | |
| 4,292,233 A | 9/1981 | Binsack et al. | |
| 4,391,954 A | 7/1983 | Scott | |
| 4,754,064 A | 6/1988 | Lillwitz | |
| 4,786,692 A | 11/1988 | Allen et al. | |
| 4,897,453 A | 1/1990 | Flora et al. | |
| 5,091,010 A | 2/1992 | Souma et al. | |
| 5,132,360 A | 7/1992 | Machado et al. | |
| 5,302,646 A | 4/1994 | Vilasagar et al. | |
| 5,321,056 A | 6/1994 | Carson et al. | |
| 5,367,016 A | 11/1994 | Miyama et al. | |
| 5,409,967 A * | 4/1995 | Carson et al. .................. | 523/201 |
| 5,441,997 A | 8/1995 | Walsh et al. | |
| 5,478,896 A | 12/1995 | Scott | |
| 5,494,969 A | 2/1996 | Abe et al. | |
| 5,510,398 A | 4/1996 | Clark et al. | |
| 5,512,631 A * | 4/1996 | Jalbert et al. ..................... | 525/66 |
| 5,614,589 A | 3/1997 | Niznik et al. | |
| 5,718,753 A * | 2/1998 | Suzuki et al. .................. | 106/403 |
| 5,731,380 A | 3/1998 | Golder | |
| 5,814,712 A | 9/1998 | Gallucci et al. | |
| 5,859,119 A | 1/1999 | Hoefflin | |
| 5,891,962 A | 4/1999 | Otsuzuki et al. | |
| 6,040,382 A | 3/2000 | Hanes | |
| 6,136,441 A | 10/2000 | MacGregor et al. | |
| 6,989,190 B2 * | 1/2006 | Gaggar et al. ................. | 428/220 |
| 7,718,733 B2 * | 5/2010 | Juikar et al. .................... | 525/67 |
| 7,767,738 B2 * | 8/2010 | Gaggar et al. .................. | 524/88 |

FOREIGN PATENT DOCUMENTS

| | | |
|---|---|---|
| EP | 0426466 | 11/1990 |
| WO | 9902594 | 1/1999 |
| WO | WO 99/63002 | * 12/1999 |

* cited by examiner

Primary Examiner — David Buttner

(57) ABSTRACT

Disclosed is a transparent/translucent molding composition and process for making prepared from an impact modifier and a resin blend of polycarbonate and a cycloaliphatic polyester having a matching index of refraction.

19 Claims, No Drawings

TRANSPARENT POLYCARBONATE POLYESTER COMPOSITION AND PROCESS

This application is a continuation of U.S. patent application Ser. No. 11/245,462 filed on Oct. 5, 2005, now 7,767,738, which was a continuation of U.S. patent application Ser. No. 10/373,547, filed on Feb. 24, 2003, now U.S. Pat. No. 6,989,190, which was continuation-in-part of U.S. patent application Ser. Nos. 09/891,731, filed Jun. 26, 2001 and now abandoned; 09/690,341, filed Oct. 17, 2000 and now abandoned; and 09/690,342, filed Oct. 17, 2000 and now abandoned, all of which are incorporated herein by reference.

FIELD OF THE INVENTION

This invention relates to transparent or translucent thermoplastic molding compositions, optionally containing visual-effect colorants and other additives and processes for producing such compositions.

BACKGROUND OF THE INVENTION

Polycarbonate (PC) is a high-performance plastic with good impact strength. In addition to ductility (impact strength), general-purpose PC has high transparency, good dimensional stability, low water absorption, good stain resistance and a wide range of colorability. A weak area for PC is its relatively limited range of chemical resistance, which necessitates careful appraisal of applications involving contact with certain organic solvents, some detergents, strong alkali, certain fats, oils and greases. Also, another weak area of PC is that it has a high melt viscosity which makes it difficult to mold. Medium to high flow PC grades suffer from the fact that the low temperature ductility is sacrificed for a better flow. Finally, PC formulations with visual-effect additives like metallic type pigments or mineral flakes are in general very brittle at room temperature. This invention deals with these shortcomings and as such proposes a material that has an unique property profile in terms of transparency, improved chemical resistance, higher flow and low temperature ductility at −20 to −40° C., even with special-effect colorants.

A widely used method to increase low temperature impact resistance, is the addition of impact modifiers to the PC compositions. Adding minor amounts of methylacrylate-butadiene-styrene (MBS) rubbers or Acrylonitrile-butadiene-styrene (ABS) rubbers results in lower D/B transition temperatures. The major drawback of these modifications is that, even with only 1% addition levels, the transparency decreases, taking away one of the key properties of PC.

This opaqueness is caused by the relatively high refractive index (RI) of the aromatic PC (1.58) compared to the more aliphatic rubbery and/or siloxane components, which have RI values in the range 1.48-1.56.

U.S. Pat. No. 6,040,382 describes how optical clarity of a blend of 2 transparent, immiscible polymers can be improved by addition of a third polymer which is selectively miscible with one of the two original immiscible polymers. The concept is based on matching refractive indexes. This patent is directed to compositions of monovinyl aromatic-conjugated diene copolymers (like styrene-butadiene block co-polymers), styrene-maleic anhydride Copolymers (SMA) and poly (alpha-methylstyrene).

U.S. Pat. No. 5,891,962; U.S. Pat. No. 5,494,969; and U.S. Pat. No. 5,614,589; respectively, describe specific formulations of rubber modified styrene; cycloolefin polymer composites; and methacrylate-acrylonitrile-butadiene-styrene copolymers with urethane copolymer. In these compositions, polymers are being replaced by co-polymers (f.i. polystyrene by a co-polymer of styrene and alkyl(meth)acrylate) to match the RI of a rubbery component. It's also possible to modify the rubbery component to match the RI of the polymer matrix, like in U.S. Pat. No. 5,321,056 and U.S. Pat. No. 5,409,967 assigned to Rohm and Haas. The focus of all these patents is to chemically modify the ingredients to match RI to achieve transparency. Matching RI to achieve transparency is as such not a novelty.

U.S. Pat. No. 5,859,119 to Hoefflin relates to reinforced, molding compositions with desirable ductility and melt flow properties. The composition contains a cyclo aliphatic polyester resin, an impact modifying amorphous resin which increases the ductility of the polyester resin but reduces the melt flow properties thereof, and a high molecular weight polyetherester polymer which increases the melt flow properties of the polyester polymer without reducing the ductility thereof, and a glass filler to reinforce and stiffen the composition and form a reinforced molding composition. This invention is focussed on opaque PC blends, rather than transparent blends.

U.S. Pat. No. 4,188,314 describes shaped articles (such as sheet and helmets) of blends of 25-98 parts by weight (pbw) of an aromatic polycarbonate and 2-75 pbw of a poly cyclohexane dimethanol phthalate where the phthalate is from 5-95% isophthalate and 95-10% terephthalate. Articles with enhanced solvent resistance and comparable optical properties and impact to the base polycarbonate resin and superior optical properties to an article shaped from a polycarbonate and an aromatic polyester, such as polyalkylene terephthalate, are disclosed.

There are other patents that deal with polycarbonate poly-cyclohexane dimethanol phthalate blends for example; U.S. Pat. No. 4,125,572; U.S. Pat. Nos. 4,391,954; 4,786,692; 4,897,453 and 5,478,896. U.S. Pat. No. 5,478,896 relates to transparent polycarbonate blends with 10-99% polyester of CHDM with some minor amount of aliphatic diol and iso and terephthalic acid. U.S. Pat. No. 4,786,692 relates to a 2-98% aromatic polycarbonate blend with a polyester made of cyclohexane dimethanol (CHDM) and ethylene glycol (EG) in a 1:1 to 4:1 ratio with iso and terephthalic acid. U.S. Pat. No. 4,391,954 describes compatible compositions of non halogen polycarbonate (PC) and amorphous polyesters of CHDM and a specific iso/tere phthalate mixture. U.S. Pat. No. 4,125,572 relates to a blend of 40-95% PC, 5-60% polybutylene terephthalate (PBT) 1-60% and 1-60% an aliphatic/cycloaliphatic iso/terephthalate resin. U.S. Pat. No. 4,897,453 describes blends of 10-90% PC, 10-90% of a polyester of 0.8-1.5 IV, comprised of 1,4-cyclohexane dicarboxylic acid, 70% trans isomer, CHDM and 15-50 wt. % poly oxytetramethylene glycol with 0-1.5 mole % branching agent. Also claimed are molded or extruded articles of the composition.

SUMMARY OF THE INVENTION

The present invention provides compositions with improved ductility and melt flow propeties, and good baseline transparency, which can then be reduced if and as desired for a specific application by the addition of visual-effects additives. The composition comprises a uniform blend of:

(a) a miscible resin blend of a polycarbonate resin and a cycloaliphatic polyester resin, said cycloaliphatic polyester resin comprising the reaction product of an aliphatic $C_2$-$C_{12}$ diol or chemical equivalent and a $C_6$-$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent;

(b) an impact modifying amorphous resin having a refractive index from about 1.51 to about 1.58 for increasing the low temperature ductility of the resin molding composition;

wherein the proportions in the blend of polycarbonate and the cycloaliphatic polyester resin are selected so that the index of refraction substantially matches the index of refraction of said impact modifier.

In one embodiment, transparent and low temperature ductile polycarbonate (PC) blends are obtained via the addition of poly(cyclohexane dimethanol cyclohexane dicarboxylate) (PCCD) and an impact modifier. The complete miscibility of PC and PCCD permits the matching of refractive index (RI) of the impact modifier with the RI of the PC/PCCD blend, by adjusting the PC/PCCD ratio. Examples of such impact modifiers are MBS/ABS type of rubbers with a particle size range from 50-1000 nm, the rubber being butadiene or styrene-butadiene with styrene content of up to 40%. Styrene to acrylonitrile ratio in ABS rubbers can be between 100/0 and 50/50 with a preferred ratio of 80/20 to 70/30. Typical examples are ABS 415 (RI=1.542) and ABS 336 (RI=1.546), both produced by GE Plastics and BTA702, BTA736, being MBS materials and produced by Rohm & Haas. All these rubbers are used in the PVC market as impact modifiers to improve the toughness of PVC without loosing the transparency.

The application further provides a method for the production of compositions with improved ductility and melt flow propeties, and good baseline transparency, which can then be reduced if and as desired for a specific application by the addition of visual-effects additives. In accordance with one embodiment of the method of the invention, a miscible resin blend of a polycarbonate resin and a cycloaliphatic polyester resin is prepared. The proportions of the polycarbonate resin and the cycloaliphatic polyester resin are selected such that the blend has a refractive index that is intermediate between the refractive indices of the two components, and that substantially matches the refractive index of an impact modifier which is added to form the final composition.

DETAILED DESCRIPTION OF THE INVENTION

The composition of the present invention comprise miscible resin blend of a polycarbonate resin and a cycloaliphatic polyester resin, said cycloaliphatic polyester resin comprising the reaction product of an aliphatic $C_2$-$C_{12}$ diol or Chemical equivalent and a $C_6$-$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent.

Polycarbonate Resin

Polycarbonates useful in the invention comprise the divalent residue of dihydric phenols, Ar', bonded through a carbonate linkage and are preferably represented by the general formula III:

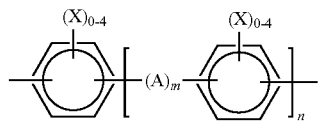

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bisphenols such as bis(4-hydroxyphenyl)methane, 2,2-bis(4-hydroxyphenyl)propane (also known as bisphenol-A), 2,2-bis (4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999, 835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. U.S. Pat. No. 4,123,436 describes reaction with phosgene and U.S. Pat. No. 3,153,008 describes a transesterification process.

Preferred polycarbonate will be made of dihydric phenols that result in resins having low birefringence for example dihydric phenols having pendant aryl or cup shaped aryl groups like:

Phenyl-di(4-hydroxyphenyl)ethane(acetophenone bisphenol):

Diphenyl-di(4-hydroxyphenyl)methane(benzophenone bisphenol):

2,2-bis(3-phenyl-4-hydroxyphenyl)propane 2,2-bis-(3,5-diphenyl-4-hydroxyphenyl)propane;

bis-(2-phenyl-3-methyl-4-hydroxyphenyl)propane;
2,2'-bis(hydroxyphenyl)fluorene;
1,1-bis(5-phenyl-4-hydroxyphenyl)cyclohexane;
3,3'-diphenyl-4,4'-dihydroxy diphenyl ether;
2,2-bis(4-hydroxyphenyl)-4,4-diphenyl butane;
1,1-bis(4-hydroxyphenyl)-2-phenyl ethane;
2,2-bis(3-methyl-4-hydroxyphenyl)-1-phenyl propane;
6,6'-dihdyroxy-3,3,3',3'-tetra methyl-1,1'-spiro(bis)indane;
(hereinafter "SBI"), or dihydric phenols derived from spiro biindane of formula IV:

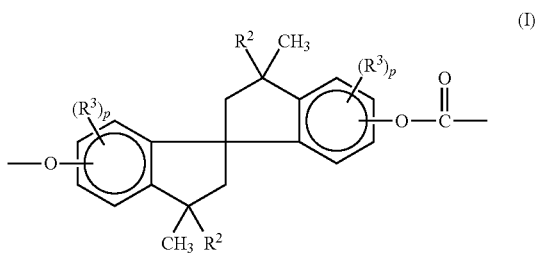

Units derived from SBI and its 5-methyl homologue are preferred, with SBI being most preferred.

Other dihydric phenols which are typically used in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

The preferred polycarbonates are preferably high molecular weight aromatic carbonate polymers have an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

Cycloaliphatic Polyester Resin

The cycloaliphatic polyester resin comprises a polyester having repeating units of the formula I:

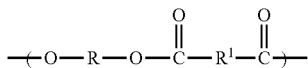

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components assist by imparting good rigidity to the polyester and to allow the formation of transparent blends due to favorable interaction with the polycarbonate resin.

The polyester resins are typically obtained through the condensation or ester interchange polymerization of the diol or diol equivalent component with the diacid or diacid chemical equivalent component. Two types of cycloaliphatic polyesters can be used with BPA-based polycarbonate to give the compositions and articles of this invention. The most preferred polyester molecules are derived from cycloaliphatic diol and cycloaliphatic diacid compounds, for example polycyclohexane dimethanol cyclohexyl dicarboxylate (PCCD). Polyesters having only one cyclic unit may also be useful. An extra advantage of adding these aliphatic polyesters to PC is that their low glass transition temperature (Tg) improves the flow of PC (or impact modified PC) significantly, resulting in an overall very favorable flow/impact balance. Another advantage is that the polyester improves the overall chemical resistance towards various chemicals that are very aggressive towards straight PC. Examples of these chemicals are acetone, coppertone, gasoline, toluene etc.

R and R1 are preferably cycloalkyl radicals independently selected from the following formula:

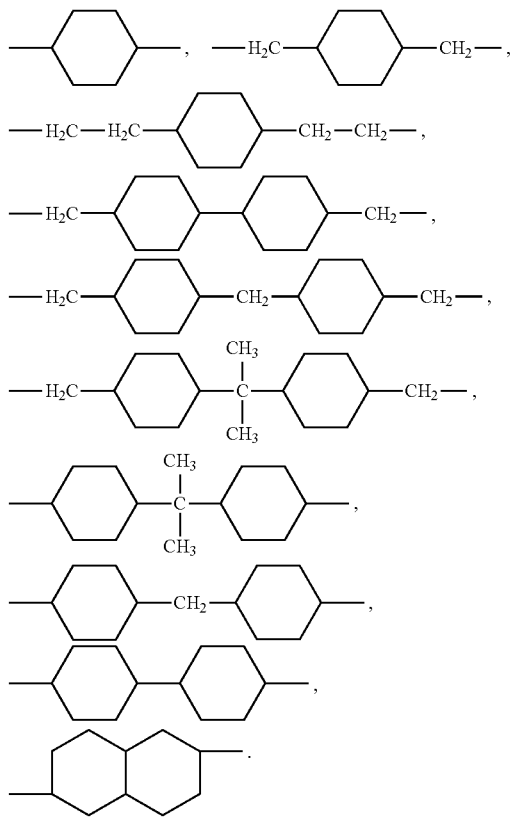

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

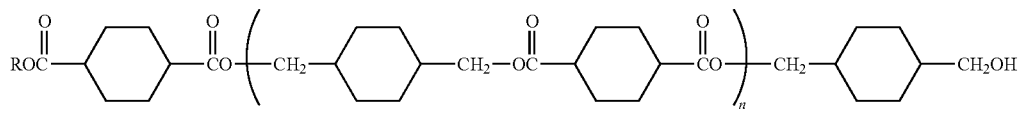

With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl)titanate, in a suitable amount, typically about 50 to 200 ppm of titanium based upon the final product.

The preferred aliphatic polyesters used in the present transparent molding compositions have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

Miscible Resin Blend

In the miscible resin blend of the invention, the preferred polycarbonate will be composed of units of BPA, SBI bisphenol, aryl substituted bisphenols, cycloaliphatic bisphenols and mixtures thereof. The most preferred materials will be blends where the polyester has both cycloaliphatic diacid and cycloaliphatic diol components specifically polycyclohexane dimethanol cyclohexyl dicarboxylate (PCCD).

In the miscible resin blends, a ratio of cycloaliphatic polyester to polycarbonate in the range of 80:20 to 5:95% by weight of the entire mixture is preferred. Blends from 70:30 to 40:60 are most preferred.

The refractive index of the miscible resin blend is determined by the components and the amounts of each. The refractive index of pure polycarbonate (PC) is 1.586 while that of PCCD is 1.516. In a mixture of polycarbonate and poly(1,4-cyclohexanedimethanol-1,4-cyclohexanedicarboxylate the refractive index of the mixture, y, varies as the function −0.0007 (weight percent poly(1,4-cyclohexanedimethanol-1,4-cyclohexanedicarboxylate) +1.586 with a regression R squared coefficient of 0.998. Similarly, resorcinol diphosphate (RDP) has a refractive index of 1.5673. A mixture having 25 weight percent RDP in PC would result in a calculate refractive index of 0.25(1.5673)+0.75(1.586)=1.581. Thus the refractive index of the mixture of the two components may be controlled between the upper and lower limits of their respective indices of refraction.

Impact Modifier

The compositions of the invention further comprise a substantially amorphous impact modifier copolymer resin that is added to the miscible resin blend in an amount between about 1 and 30% by weight. The impact modifier may comprise one of several different rubbery modifiers such as graft or core shell rubbers or combinations of two or more of these modifiers. Suitable are the groups of modifiers known as acrylic rubbers, ASA rubbers, diene rubbers, organosiloxane rubbers, EPDM rubbers, SBS or SEBS rubbers, ABS rubbers, MBS rubbers and glycidyl ester impact modifiers.

The term acrylic rubber modifier can refer to multi-stage, core-shell, interpolymer modifiers having a cross-linked or partially crosslinked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth) acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Preferred rubbers are graft or core shell structures with a rubbery component with a Tg below 0° C., preferably between about –40° to –80° C., composed of poly alkylacrylates or polyolefins grafted with PMMA or SAN. Preferably the rubber content is at least 40 wt %, most preferably between about 60-90 wt %.

Especially suitable rubbers are the butadiene core-shell polymers of the type available from Rohm & Haas, for example Paraloid® EXL2600. Most preferably, the impact modifier will comprise a two stage polymer having an butadiene based rubbery core and a second stage polymerized from methylmethacrylate alone or in combination with styrene. Surprisingly, with opaque impact modifiers like MBS EXL2600, the effect of adding PCCD to these PC/impact modifier compositions had very similar results; high transmissions and low haze values were obtained with modifiers, each modifier having a unique PC/PCCD ratio to match the RI Of thermoplastic blend to the RI of the impact modifier.

Other suitable rubbers are the ABS types Blendex® 336 and 415, available form GE Specialty Chemicals. Both rubbers are based on impact modifier resin of SBR rubber. Although the mentioned rubbers appear to be very suitable, there are many more rubbers which can be used. Actually any rubber which has a reasonable clarity and which has an RI between the RI of the components of the miscible resin blend can be used, for example between 1.51 and 1.58 when the blend is PC and PCCD can be used to the present invention.

The ABS type thermoplastic resins utilized by the present invention are graft copolymers of vinyl cyanide monomers, di-olefins, vinyl aromatic monomers and vinyl carboxylic acid ester monomers. Thus applicants define herein the phrase ABS type or acrylonitrile-butadiene-styrene type to include the group of polymers derived from vinyl cyanide monomers, di-olefins, vinyl aromatic monomers and vinyl carboxylic acid ester monomers as hereinafter defined. Vinyl cyanide monomers are herein defined by the following structural formula:

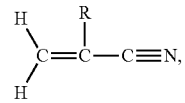

where R is selected from the group consisting of hydrogen, alkyl groups of from 1 to 5 carbon atoms, bromine and chlorine. Examples of vinyl cyanide monomers include acrylonitrile, methacrylonitrile, ethacrylonitrile, (-chloroacrylonitrile and (-bromoacrylonitrile. The di-olefins utilized in the present invention are herein defined by the following structural formula:

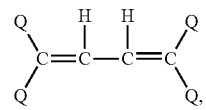

where each Q is independently selected from the group consisting of hydrogen, alkyl groups of from 1 to 5 carbon atoms, bromine and chlorine. Examples of di-olefins include butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, chlorobutadiene, bromobutadiene, dichlorobutadiene, dibromobutadiene and mixtures thereof. Vinyl aromatic monomers are herein defined by the following structural formula:

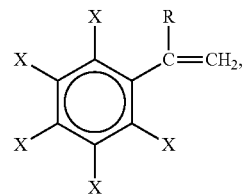

where each X is independently selected from the group consisting of hydrogen, alkyl groups of from 1 to 5 carbon atoms, cycloalkyl, aryl, alkaryl, aralkyl, alkoxy, aryloxy and halogen and where R is independently selected from the group consisting of hydrogen, alkyl groups of from 1 to 5 carbon atoms, bromine and chlorine. The phrase independently selected means that co-polymers, terpolymers, or other interpolymers of these vinyl cyanide monomers may have an independently selected R for the vinyl cyanide relative to the R selected for the vinyl aromatic monomer. Examples of substituted vinyl aromatic monomers include styrene, 4-methylstyrene, vinyl xylene, 3,5-diethylstyrene, p-tert-butyl-styrene, 4-n-propyl styrene, (-methyl-styrene, (-ethyl-styrene, (-methyl-p-methylstyrene, p-hydroxy-styrene, methoxy-styrenes, chloro-styrene, 2-methyl-4-chloro-styrene, bromo-styrene, (-chloro-styrene, (-bromo-styrene, dichloro-styrene, 2,6-dichloro-4-methyl-styrene, dibromo-styrene, tetrachloro-styrene and mixtures thereof. Vinyl carboxylic acid ester monomers (esters of alpha-, beta-u unsaturated carboxylic acids) are herein defined by the following structural formula:

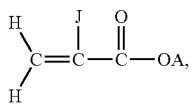

where J is selected from the group consisting of hydrogen and alkyl groups of from 1 to 8 carbon atoms and A is selected from the group consisting of alkyl groups of from 1 to 5 carbon atoms. Examples of vinyl carboxylic acid ester monomers include methyl methacrylate, methyl acrylate, ethyl methacrylate, ethyl acrylate, butyl methacrylate, butyl acrylate, propyl methacrylate, propyl acrylate, 2-ethylhexyl acrylate, 2-ethylhexyl methacrylate, methyl ethacrylate and mixtures thereof.

It will be understood that by the use of "monomers" are included all of the polymerizable species of monomers and copolymers typically utilized in polymerization reactions, including by way of example monomers, homopolymers of primarily a single monomer, copolymers of two or more monomers, terpolymers of three monomers and physical mixtures thereof. For example, a mixture of polymethylmethacrylate (PMMA) homopolymer and styrene-acrylonitrile (SAN) copolymer may be utilized to form the "free rigid phase", or alternatively a methylmethacrylate-styrene-acrylonitrile (MMASAN) terpolymer may be utilized.

Various monomers may be further utilized in addition to or in place of those listed above to further modify various properties of the compositions disclosed herein. In general, the components of the present invention may be compounded with a copolymerizable monomer or monomers within a range not damaging the objectives and advantages of this invention. For example, in addition to or in place of SBR, the rubber phase may be comprised of polybutadiene, butadiene-acrylonitrile copolymers, polyisoprene, EPM and EPR rubbers (ethylene/propylene rubbers), EPDM rubbers (ethylene/propylene/non-conjugated diene rubbers) and crosslinked alkylacrylate rubbers based on $C_1$-$C_8$ alkylacrylates, in particular ethyl, butyl and ethylhexylacrylates, either alone or as a mixture of two or more kinds. Furthermore, the rubber may comprise either a block or random copolymer. In addition to or in place of styrene and acrylonitrile monomer used in the graft or free rigid phase, monomers including vinyl carboxylic acids such as acrylic acid, methacrylic acid and itaconic acid, acrylamides such as acrylamide, methacrylamide and n-butyl acrylamide, alpha-, beta-unsaturated dicarboxylic anhydrides such as maleic anhydride and itaconic anhydride, imides of alpha-, beta-unsaturated dicarboxylic acids such as maleimide, N-methylmaleimide, N-ethylmaleimide, N-Aryl maleimide and the halo substituted N-alkyl N-aryl maleimides, imidized polymethyl methacrylates (polyglutarimides), unsaturated ketones such as vinyl methyl ketone and methyl isopropenyl ketone, alpha-olefins such as ethylene and propylene, vinyl esters such as vinyl acetate and vinyl stearate, vinyl and vinylidene halides such as the vinyl and vinylidene chlorides and bromides, vinyl-substituted condensed aromatic ring structures such as vinyl naphthalene and vinyl anthracene and pyridine monomers may be used, either alone or as a mixture of two or more kinds.

Preferred impact modifiers are of the type disclosed in U.S. Pat. No. 4,292,233; incorporated by reference. These impact modifiers comprise, generally, a relatively high content of a cross-linked butadiene polymer grafted base having grafted thereon acrylonitrile and styrene.

The acrylonitrile-butadiene-styrene type (ABS) thermoplastic resin is preferably based on a SBR high rubber graft with a SAN free rigid phase. Rubber amounts between about 20 percent and about 45 percent are preferred. This ABS composition preferably comprises: a) a free rigid phase derived from a vinyl aromatic monomer and a vinyl carboxylic acid ester monomer, wherein the free rigid phase is present at a weight percent level of from about 30 to about 70 percent by weight based on the total weight of the composition, more preferably from about 35 to about 50 percent by weight thereof, and most preferably from about 38 to about 47 percent by weight thereof; b) a graft copolymer (graft phase) comprising a substrate copolymer and a superstrate copolymer wherein the substrate copolymer comprises a copolymer derived from a vinyl aromatic monomer and a di-olefin and wherein the superstrate copolymer comprises a copolymer derived from an aromatic monomer wherein the graft copolymer is present at a level of from about 30 to about 70 weight percent of the total weight of the composition, more preferably from about 50 to about 65 percent by weight thereof, and most preferably from about 53 to about 62 percent by weight thereof; and c) wherein the refractive index of the free rigid phase and the calculated refractive index of the graft phase are approximately the same (that is, matched to within about 0.005 or less). The refractive index of the phases may be readily calculated based on the weight percentage of the components and their refractive indices, for example:

The refractive indices of butadiene, styrene, acrylonitrile and methyl methacrylate homo-polymers are 1.515, 1.591, 1.515 and 1.491 respectively. A butadiene/styrene ratio of 85:15 gives a calculated refractive index of (0.85×1.515)+ (0.15×1.591)=~1.526.

The grafted SAN having a styrene to acrylonitrile ratio of 80:20 gives a calculated refractive index of (0.80×1.591)+ (0.20×1.515)=~1.576.

A graft copolymer of 65% styrene-butadiene rubber (butadiene:styrene=85:15) and 35% grafted SAN (styrene:acrylonitrile=80:20) gives a calculated refractive index of (0.65× 1.526)+(0.35×1.576)=~1.544.

In the example above, the free rigid phase must have approximately the same refractive index as the graft rubber phase within ±0.005. A free rigid phase of 60% PMMA and 40 percent SAN of 75% styrene and 25% acrylonitrile has a refractive index of approximately 1.539, thereby matching the graft phase refractive index to within 0.005.

The free rigid phase is preferably derived from styrene-acrylonitrile (SAN). The ratio of styrene to acrylonitrile is preferably from 1.5 to 15 (that is, preferably from about 60 percent to about 94 percent styrene) and from about 6 percent to about 40 percent acrylonitrile by weight based on the total weight of the free rigid phase, more preferably from about 4 to 12 (from about 80 percent to about 92 percent styrene) and from about 8 percent to about 20 percent acrylonitrile by weight based on the total weight of the free rigid phase and most preferably from about 6 to 9 (from about 85 percent to about 90 percent styrene) and from about 10 percent to about 15 percent acrylonitrile by weight based on the total weight of the free rigid phase. The graft copolymer is preferably derived from a vinyl aromatic-di-olefin rubber substrate copolymer. The graft copolymer preferably comprises from about 40 percent to about 90 percent of a substrate copolymer and from about 10 percent to about 60 percent of a superstrate copolymer based on the total weight of the graft copolymer, more preferably from about 55 percent to about 75 percent of a substrate copolymer and from about 25 percent to 45 percent of a superstate copolymer by weight thereof, and most preferably about 65 percent by weight of a substrate copolymer and 35 percent by weight of a superstrate copolymer. The substrate copolymer preferably comprises a vinyl aromatic component level of from slightly greater than about 0 percent to about 30 percent by weight based on the total weight of the substrate copolymer, more preferably from 10 to 20 percent by weight thereof and most preferably 15 percent by weight thereof, and a di-olefin component level of from about 70 percent to about 100 percent of a di-olefin by weight based on the total weight of the substrate copolymer, more preferably from about 80 to about 90 percent by weight thereof, and most preferably about 85 percent by weight thereof. The superstrate may optionally contain a vinyl carboxylic acid ester component such as methyl methacrylate. The graft phase preferably has a weight average particle size of less than 2400 angstroms (0.24 microns), more preferably less than 1.600 angstroms (0.16 microns) and most preferably less than 1200 angstroms (0.12 microns). Generally, the particle size of the rubber has an effect upon the optimum grafting level for the graft copolymer. As a given weight percentage of smaller size rubber particles will provide greater surface area for grafting than the equivalent weight of a larger rubber particle size, the density of grafting may be varied accordingly. In general, smaller rubber particles preferably utilize a higher superstrate/substrate ratio than larger size particles to give generally comparable results.

The graft phase may be coagulated, blended and colloided with the free rigid phase homopolymers, copolymers and/or terpolymers by the various blending processes that are well known in the art to form the ASA polymer polyblend.

Preferred Compositions of the Invention

The preferred impact-modified, cycloaliphatic polymer compositions of the present invention comprise:

(A) from 20 to 80% by weight of a blend of polycarbonate and cyclo aliphatic polyester resin, where the ratio of polycarbonate to cyclo aliphatic polyester resin is from 20/80 to 95/5, preferable from 30/70 to 60/40, the cyclo aliphatic polyester comprises the reaction product of:

(a) at least one straight chain, branched, or cycloaliphatic $C_2$-$C_{12}$ alkane diol, most preferably a $C_6$-$C_{12}$ cycloaliphatic diol, or chemical equivalent thereof; and (b) at least one cycloaliphatic diacid, most preferably a $C_6$-$C_{12}$ diacid, or chemical equivalent thereof; and (B) from 1 to 30%, preferably from 5 to 20% by weight of an impact modifier comprising a substantially amorphous resin comprising one of several different modifiers or combinations of two or more of these modifiers. Suitable are the groups of modifiers known as ABS modifiers ASA modifiers, MBS modifiers, EPDM graft SAN modifiers, acrylic rubber modifiers.

The method of blending the compositions can be carried out by conventional techniques. Preferably the polyester and polycarbonate are pre-blended in an amount selected to match the refractive index of the modifier. The ingredients are typically in powder or granular form, extruding the blend and comminuting into pellets or other suitable shapes. The ingredients are combined in any usual manner, e.g., by dry mixing or by mixing in the melted state in an extruder, or in other mixers.

Impact modified polycarbonate resins as outlined above are excellent materials for applications requiring high impact, chemical resistance, and appealing aesthetic. In order to improve the appearance, special effect additives have been utilized as colorants. U.S. Pat. No. 5,510,398 to Clark et al relates to a highly filled, extruded polyalkylene terephthalate resin, a polycarbonate resin, a filler, a stabilizer, and a non-dispersing pigment to give the extruded thermoplastic material a speckled surface appearance. Column 5, lines 35 to column 6, line 61, describes impact modifiers. U.S. Pat. No. 5,441,997 to Walsh et al describes the use of impact modifiers in conjunction with polycarbonate/polyester compositions having a barium sulfate, strontium sulfate, zirconium oxide, or zinc sulfate filler. U.S. Pat. No. 5,814,712 to Gallucci et al describes a glycidyl ester as an impact modifier, and optionally other impact modifiers, for a polycarbonate/polyester resin. U.S. Pat. No. 4,264,487 to Fromuth et al describes aromatic polycarbonate, acrylate-based core-shell polymer, and aromatic polyester.

Visual-Effect Additives

In the compositions of the invention, one or more visual-effects additives of various types may be added as desired.

Glitter Type of Materials

As the glitter material, it is suitable to use one or more kinds selected from the group consisting of mica, pearl mica, glass flake, aluminum powder, stainless powder, brass powder, metallic plating powder, metallic coating powder, aluminum flake, aluminum foil, zinc, and bronze powder. This leads to an advantage of an excellent glitter feeling. It is particularly preferable to use a glitter material having a high transmittance with respect to a visible ray such as mica; pearl mica, glass flake, or the like. These materials further improve the glitter and color depth of a skin layer, and moreover, provide a color tone with high gloss, depth and glitter feel to the glitter resin molded material by light that has transmitted through the skin layer and reflected on the surface of a core layer which is colored with a coloring pigment.

The coloring pigment contained in the skin layer and the core layer is suitably one or more kinds selected from a group of organic pigments such as phthalocyanine blue, cyanine green, indanthrene, azo, anthraquinone, perylene, perynone, quinacridone, isoindolinone, thioindigo, dioxazine; a group of inorganic pigments such as titanium oxide, titanium yellow, red iron oxide, burned pigment, carbon black; and a group of dyes such as phthalocyanine, anthraquinone, perylene, perynone.

Granite Type of Additives

Many large opaque particles can be used to make the simulated granite. These particles can be colored or uncolored. Typical mineral particles that can be used are calcined talc, magnetite, siderite, ilmenite, goethite, galena, graphite, anthracite and bituminous coal, chalcopyrite, pyrite, hematite, limonite; pyroxenes such as augite; amphiboles such as hornblende; biotite, sphalerite, anatase, corunbum, diamond, carborundum, anhydrite, chalk, diurite, rutile, sandstone, shale, slate, sparite, vermiculite, natural granite, peat and basalt. Other useful materials are chips of brick, charcoal, concrete, plaster, porcelain, sawdust, seashells, slag, wood and the like, various filled or pigmented chips of insoluble or crosslinked polymers such as ABS resins, cellulose esters, cellulose ethers, epoxy resins, polyethylene, ethylene copolymers, melamine resins, phenolic resins, polyacetals, polyacrylics, polydienes, polyesters, polyisobutylenes, polypropylenes, polystyrenes, urea/formaldehyde resins, polyureas, polyurethanes, polyvinyl chloride, polyvinylidene chloride, polyvinyl esters and the like.

Useful large translucent and transparent particles are natural or synthetic minerals or materials such as agate, alabaster, albite, calcite, chalcedony, chert, feldspar, flint quartz, glass, malachite, marble, mica, obsidian, opal, quartz, quartzite, rock gypsum, sand, silica, travertine, wollastonite and the like; and moderately filled or unfilled, pigmented or dyed, insoluble or crosslinked chips of polymers referred to in the last paragraph.

The large opaque, translucent and/or transparent particles are present in the simulated granite at a concentration of about 0.1-50% by volume, preferably about 1-35% by volume. The opaque particles are most preferably at a concentration of about 5-25% by volume while the concentration of the translucent or transparent particles is most preferably about 5-30% by volume.

Additional additives can be included in the simulated granite article to give it decorative effects or to color the matrix background. These additives can be incorporated at a concentration up to about 10% by volume; however, when dyes or pigments are used to color the matrix, the color concentration cannot be so great as to hide the large opaque, translucent and transparent particles. The optical density of a 0.05 inch thick wafer must be less than 3.0 and the surface must exhibit a granite-like pattern.

The surface patterns of a number of different natural granites have been defined by IMANCO® Quantimet 720 image analysis. These patterns have about 0.1 to 40% area detectable at densitometric level 820, about 0 to 30% additional area detectable at level 860, about 0.1 to 25% additional area detectable at level 900, about 0 to 25% additional area detectable at level 950 and about 15 to 95% additional area detectable at a level greater than 950. It is preferred that the simulated granite have essentially the same surface pattern.

In addition to dyes and pigments, other useful decorative additives are metallic fibers, dusts, flakes, chips or shavings such as aluminum, copper, bronze, brass, chromium, nickel, gold, iron, steel, platinum, silver, tin, titanium, tungsten, zinc and the like; non-metallic chips or flakes such as titanium nitride, nickel sulfide, cobalt sulfide, anhydrous chromic chloride and magnesium sulfide; and natural or colored flocks or chopped fibers such as asbestos, rayon, cotton, nylon, flax, polyester, glass, hair, hemp, paper pulp, polyacrylonitrile, polyethylene, polypropylene, protein, rock wool, wood fiber, wool and the like.

The simulated granite is prepared by first preparing a castable composition. This composition can be made by preparing a mixture of the large opaque particles, the large transparent and/or translucent particles and, if desired, any of the solid optional ingredients such as the decorative particles. The matrix for the composition is prepared by mixing the polymerizable constituent, a viscosity control constituent, an initiating amount of an initiator system for the polymerizable constituent, the small filler particles and any other optional ingredients such as a cross-linking or coloring agent. These two mixtures are mixed at a ratio which will give the desired visual effect in the final product and then this final mixture, called the castable composition is poured onto a surface which takes the form of the final article, e.g. a flat surface for simulated granite sheets or a mold for simulated granite shaped articles. The poured mixture is then cured autogenically. The matrix mixing can be conducted at a temperature in the range of about 20° to 50° C. provided that the initiator system is not added until ready to cast.

Colored Pigments

In general, the effect pigment is a metallic-effect pigment, a metal oxide-coated metal pigment, a platelike graphite pigment, a platelike molybdenumdisulfide pigment, a pearlescent mica pigment, a metal oxide-coated mica pigment, an organic effect pigment, a layered light interference pigment, a polymeric holographic pigment or a liquid crystal interference pigment. Preferably, the effect pigment is a metal effect pigment selected from the group consisting of aluminum, gold, brass and copper metal effect pigments; especially aluminum metal effect pigments. Alternatively, preferred effect pigments are pearlescent mica pigments or a large particle size, preferably platelet type, organic effect pigment selected from the group consisting of copper phthalocyanine blue, copper phthalocyanine green, carbazole dioxazine, diketopyrrolopyrrole, iminoisoindoline, iminoisoindolinone, azo and quinacridone effect pigments.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red. 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, or a mixture or solid solution thereof.

Suitable colored pigments also Maude inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate and mixed metal oxides.

Most preferably, the colored pigment is a transparent organic pigment. Pigment compositions wherein the colored pigment is a transparent organic pigment having a particle size range of below 0.2 µm, preferably below 0.1 µm, are particularly interesting. For example, inventive pigment compositions containing, as transparent organic pigment, the transparent quinacridones in their magenta and red colors, the transparent yellow pigments, like the isoindolinones or the yellow quinacridone/quinacridonequinone solid solutions, transparent copper phthalocyanine blue and halogenated copper phthalocyanine green, or the highly-saturated transparent diketopyrrolopyrrole or dioxazine pigments are particularly interesting.

Adding a fluorescent dyestuff generates striking visual effects for the article: Suitable fluorescent dyestuffs include Permanent Pink R (Color Index Pigment Red 181, from Clariant Corporation), Hostasol Red 5B (Color Index #73300, CAS #522-75-8, from Clariant Corporation) and Macrolex Fluorescent Yellow 10GN (Color Index Solvent Yellow 160: 1, from Bayer Corporation). Among these, Permanent Pink R is preferred.

Typically the pigment composition is prepared by blending the pigment with the filler by known dry or wet mixing techniques. For example, the components are wet mixed in the end step of a pigment preparatory process, or by blending the filler into an aqueous pigment slurry, the slurry mixture is then filtered, dried and micropulverized.

In a preferred method, the pigment is dry blended with the filler in any suitable device which yields a nearly homogenous mixture of the pigment and the filler. Such devices are, for example, containers like flasks or drums which are submitted to rolling or shaking, or specific blending equipment like for example the TURBULA mixer from W. Bachofen, CH-4002 Basel, or the P-K TWIN-SHELL INTENSIFIER BLENDER from Patterson-Kelley Division, East Stroudsburg, Pa., 18301.

The pigment compositions are generally used in the form of a powder which is incorporated into a high-molecular-weight organic composition, such as a coating composition, to be pigmented.

The pigment composition consists of or consists essentially of the filler and colored pigment, as well as customary additives for pigment compositions. Such customary additives include texture-improving agents and/or antiflocculating agents.

The following patents relate to metallic type pigments. WO 99/02594 which describes the use of rectangular aluminum flakes in Nylon compositions. U.S. Pat. No. 5,091,010 and EP 0 426 446 relate to the aesthetics of molded articles containing flakes. These references do not address mechanical performance concerns which are addressed by the present invention.

Among the problems to be solved when utilizing polycarbonate resins and particles and pigments to produce special color effects are those related to composition coloring and those related to producing a very bright, metallic reflective sparkle appearance in the molded articles while retaining impact strength and transparency. For most visual effects, it is desirable to have a completely transparent matrix in order to obtain the deepest color effect. The use of modifiers in combination various colorant additives may be detrimental to physical properties such as notched Izod impact. Although various impact modifiers are known in the prior art, the prior art is deficient in addressing the problem of enhancing the impact properties of polycarbonate (alloys) having special effect colorants, while maintaining the transparency. The blend compositions as described in this invention combine appealing aesthetics, chemical resistance, and high impact properties and will be useful in molded article applications where this combination of properties is desirable.

Other Additives

Additionally, additives such as antioxidants, heat resisting agents, anti-weathering agents, mold release agents, lubricants, nucleating agents, plasticizers, flow-improving agents and anti-statics, quenchers; minerals such as talc, clay, mica, barite, wollastonite and other stabilizers including but not limited to UV stabilizers, such as benzotriazole, supplemental reinforcing fillers such as flaked or milled glass, and the like, flame retardants, pigments or combinations thereof may be added to the compositions of the present invention. These additives may be introduced in a mixing or molding process, provided the properties of the composition are not damaged.

Suitable antistatic agents include, but are not limited to, phosphonium salts, polyalkylene glycols, sulfonium salts and alkyl and aryl ammonium salts.

Suitable mold release agents include, but are not limited to, pentaerythritol tetracarboxylate, glycerol monocarboxylates, glycerol tricarboxylates, polyolefins, alkyl waxes and amides.

In the thermoplastic compositions which contain a cycloaliphatic polyester resin and a polycarbonate resin it is preferable to use a stabilizer or quencher material. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the polyester polycarbonate blend.

A preferred class of stabilizers including quenchers are those which provide a transparent and colorless product. Typically, such stabilizers are used at a level of 0.001-10 weight percent and preferably at a level of from 0.005-2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

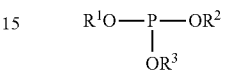

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

wherein M is a metal, x is a number ranging from 1 to 12 and y is a number ranging 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

The glass transition temperature of the preferred blend will be from 60 to 150° C. with the range of 90-150° C. most preferred.

A flexural modulus (as measured by ASTM method D790) at room temperature of greater than or equal to 150,00 psi is preferred, with a flexural modulus of greater than or equal to 250,000 psi being more preferred.

The yellowness index (YI) will be less than 10, preferably less than 5 as measured by ASTM method D1925.

Haze, as measured by ASTM method D1003, will be below 5% in the preferred composition, however in some cases higher haze levels (5-60%) are preferred in cases where the highest heat resistance is needed.

Above described materials have also been tested in GE Structured Products applications like film and coextruded solid sheet materials. In film advantages like "cold" forming (the low Tg of the material enables the operator to use lower temperatures to thermoform the film), improved tensile impact and chemical resistance were seen. These products will perfectly suit in applications like eg. transparent keypads for mobile phones, where customers require the possibility to form these films at low temperatures (below 100° C.) and further require an improved punch ductility and chemical resistance. Other typical applications of such films are automotive trim, automotive interior parts, portable telecommunications and appliance fronts. Another advantage in film applications is the possibility to add Visual effects pigments (such as coated Al and glass flakes), which are normally negatively affecting the mechanical properties of Polycarbonate, to this PC/PCCD/ABS blend to enhance required Impact properties. These films can be used in direct film applications but also in processes like IMD (In Mould Decoration).

EXAMPLES

The following examples serve to illustrate the invention but are not intended to limit the scope of the invention. Blends were prepared by tumbling all ingredients together for 1-5 min at room temperature followed by extrusion at 250-300° C. on a co-rotating 30 mm vacuum vented twin screw extruder. Blends were run at 300 rpm. The output was cooled as a strand in a water bath and pelletized.

The resultant materials were dried at 100-120° C. for 3-6 h and injection molded in discs or sections of discs (fans) for evaluation of optical properties.

Blends of PCCD with BPA-PC and various impact modifiers were prepared and various stabilizers were added to give good color and melt stability. The samples were compounded on a twin screw extruder and injection-molded at standard conditions.

Example 1

| Batch # | PC 105 grade % | PCCD 4000 poise % | stabilizers % | Impact Modifier % | PC/PCCD ratio | Transmission 2 mm % | MVR (cc/10') (300° C. 1.2 kg) | D/B ° C. |
|---|---|---|---|---|---|---|---|---|
| 1 | 99.8 | | 0.2 | | | 91.4 | 5.1 | −10 |
| 2 | 69.6 | 30 | 0.4 | | 70/30 | 90.4 | 16.8 | 0 |
| 3 | 28.4 | 66.2 | 0.4 | 5% MBS | 30/70 | 89.5 | 31.6 | −20 |
| 4 | 25.4 | 59.2 | 0.4 | 15% MBS | 30/70 | 88.5 | 14.3 | −32 |
| 5 | 30.6 | 54 | 0.4 | 15% clear ABS | 36/64 | 89.6 | 22.2 | −6 |
| 6 | 47.3 | 47.3 | 0.4 | 10% ABS 415 | 50/50 | 89.8 | 7.4 | −22 |
| 7 | 46.6 | 38.1 | 0.4 | 15% ABS 336 | 45/50 | 88.1 | 6.7 | −33 |
| 8 | 67.2 | 22.4 | 0.4 | 10% ABS 336 | 25/75 | 77.1 | 4.8 | −32 |

From the data batch 1-7 it is clear that adding PCCD to PC gives a significant improvement in flow. Adding impact modifiers not only gives an improvement in flow, but also improves low temperature ductility, while obtaining high transparencies in the same range as PC.

In some cases lower amounts of PCCD are desired, than the ones mentioned in batch 2-7. This can be from a cost perspective or that for some applications more heat is required. Although this will result in lower transmission values (the 100% match of RI is no longer present in the blend), in many cases these values are still high enough to allow for adding special/visual effects like glass or metal flakes and in some cases some translucency is even desired. A typical example is given in the table for batch 8.

Example 2

These property enhancements are further illustrated in the next table, in which some typical comparisons are made between PC formulated with special effects and blends of PC/PCCD and impact modifier, formulated with the same type of special effects.

| batch # | PC 105 grade % | PCCD 2000 poise % | stabilizers % | Impact Modifier % | Special Effect | MVR (cc/10') (265° C. 5 kg) | D/B ° C. |
|---|---|---|---|---|---|---|---|
| 9 | 98.3 | | 0.5 | | 1.2% glass/silver flakes | 10.1 | >25 |
| 10 | 41.7 | 41.7 | 0.4 | 15% ABS 415 | 1.2% glass/silver flakes | 12.8 | −22 |
| 11 | 99.3 | | 0.5 | | 0.2% variochr. red (AngularMetameric) | 10.4 | >25 |
| 12 | 41.7 | 41.7 | 0.4 | 15% ABS 415 | 0.2% variochr. red (AngularMetameric) | 12.8 | −18 |

It is obvious from the data that typical effects like glass and metal flakes turn PC into very brittle blends. However with the correct PCCD and impact modifier loading, the visual effect was very similar to the PC sample, but the blend was still ductile at lower than 0° C. and even had an improved flow. This remarkable achievement of highly ductile, transparent materials with special effects like Angular Metamerism, Diamond, Diffusion and Pearl effects is not restricted to the ones mentioned in the examples.

Example 3

Film material with a thickness of 220 Microns was produced from a 45/45/10% ratio PC/PCCD/ABS blend and tested with 100% PC film as a reference material. Following results were obtained:

| Test name: | Film sample 1 100% PC | Film sample 2 45/45/10% PC/PCCD/ABS | Film sample 3 40/60% PC/PCCD |
|---|---|---|---|
| Tensile Impact Kj/m2 | 961 | 1129 | 1147 |
| Elongation to br. % | 75.2 | 98.3 | 87.5 |
| After stress cracking "sweat" test: Tensile Strain at max % | 102.8 | 126.4 | 154.6 |
| Taber Abrasion ASTM D1044 25 Rotations Haze % | 27 | 24 | 19 |

From this example it is apparent that impact properties of film material made from PC/PCCD mixtures is improved significantly compared to PC alone, either with or without adding impact modifiers. Also the chemical resistance towards artificial sweat has improved.

Example 4

The polyester PCCD (with low RI [RI of PCCD~1.525) that is fully miscible with PC can be used to lower the RI of the PC phase (phase 1) to the RI of a clear ABS (that has RI of SAN and Rubber phases already matched). This results in transparent PC/SAN/rubber blend. Mixtures of PC/PCCD resulted in linear RI going from 1.525 to 1.577 when using 100% PCCD to 100% PC respectively. The Clear ABS that was utilized in this example had a RI of 1.548. In order to match this a PC/PCCD ratio of 54 to 31 was prepared and mixed with 15 wt. % of clear ABS. The results of samples from this blend were as follows:

| Transmission (%, 3.2 mm) | 85 |
|---|---|
| Haze (ASTM9125) | 15 |

The refractive index of pure polycarbonate (PC) is 1.586 while that of PCCD is 1.516. In a mixture of polycarbonate and poly (1,4-cyclohexanedimethanol-1,4-cyclohexanedicarboxylate the refractive index of the mixture, y, varies as the function −0.0007 (weight percent poly (1,4-cyclohexanedimethanol-1,4-cyclohexanedicarboxylate)+1.586 with a regression R squared coefficient of 0.998. Thus the refractive index of the mixture of the two components may be controlled between the upper and lower limits of their respective indices of refraction.

What is claimed is:

1. A composition comprising a uniform blend of:
    a) a resin blend of a polycarbonate resin and a cycloaliphatic polyester resin, said cycloaliphatic polyester resin comprising the reaction product of an aliphatic $C_2$-$C_{12}$ diol or chemical equivalent and a $C_6$-$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent; and
    b) an impact modifying amorphous resin having a refractive index from about 1.51 to about 1.58;
    wherein the miscible blend comprises the polycarbonate and the cycloaliphatic polyester resin in amounts such that the index of refraction of the blend matches the index of refraction of said impact modifier to produce a transparent or translucent composition,
    wherein the composition further comprises about 0.0001 to about 7 percent by weight of mica flakes for imparting a desired visual effect, said impact modifier enhancing the impact strength of molded composition as compared to a molding composition absent said impact modifier.

2. The composition according to claim 1, wherein the cycloaliphatic polyester resin comprises the reaction product of a $C_6$-$C_{12}$ cycloaliphatic diol or chemical equivalent and a $C_6$-$C_{12}$ cycloaliphatic diacid or chemical equivalent.

3. The composition according to claim 2, wherein the ratio of polycarbonate resin to cycloaliphatic polyester resin in the blend is from 95/5 to 20/80, and wherein the composition comprises from 1 to 30% by weight of the impact modifying amorphous resin.

4. The composition according to claim 1, wherein the impact modifying amorphous resin is selected from the group consisting of graft or core-shell acrylic rubbers, diene rubber polymers and silicone rubber polymers.

5. The composition according to claim 4, wherein the impact modifying amorphous resin comprises a MBS core-shell polymer.

6. The composition according to claim 5 in which the impact modifying amorphous resin comprises an ABS rubber.

7. The composition according to claim 1 where the blend has % transmittance of greater than or equal to 75%.

8. The composition according to claim 1 where the blend has a glass transition temperature of from 60 to 150° C.

9. The composition according to claim 1 with the addition of about 0.0001 to about 7 percent by weight of metal flakes for imparting a desired visual effect, said impact modifier enhancing the impact strength of molded composition as compared to a molding composition absent said impact modifier.

10. The composition according to claim 9 wherein said metal flakes are aluminum.

11. The composition according to claim 1 wherein the mica flakes comprise from about 0.05 to about 5.0 weight percent of the resin composition.

12. The composition according to claim 9 wherein said metal flakes range in size from 17.5 microns to 650 microns.

13. The composition according to claim 9 wherein the metal flakes are selected from the group consisting of metals of Group I-B, III-A, IV, VI-B and VIII of the periodic table and physical mixtures and alloys of these metals.

14. The composition according to claim 9 wherein the metal flakes selected from the group consisting of aluminum, bronze, brass, chromium, copper, gold, iron, molybdenum, nickel, tin, titanium and zinc, alloys of these metals and physical mixtures thereof.

15. The composition according to claim 1 further comprising a background colorant having a different coloration than said mica flakes.

16. The composition according to claim 15 wherein said colorant is selected from the group consisting of carbon black, phthalocyanine blues, phthalocyanine greens, anthraquinone dyes, scarlet 3b Lake, azo compounds, acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes and polymethine pigments.

17. The composition according to claim 1 where the blend further contains an effective amount of a stabilizer to prevent color formation.

18. The composition according to claim 17 wherein the stabilizer is chosen from the group consisting of: phosphorus oxo acids, acid organo phosphates, acid organo phosphites, acid phosphate metal salts, acidic phosphite metal salts or mixture thereof giving an article with greater than or equal to about 70% transmittance.

19. The composition according to claim 1 wherein the cycloaliphatic polyester is comprised of cycloaliphatic diacid and cycloaliphatic diol units.

* * * * *